April 12, 1932.　　　　M. COLLIS　　　　1,854,109
DOUGH LEVELING MACHINE
Filed April 8, 1931　　2 Sheets-Sheet 1

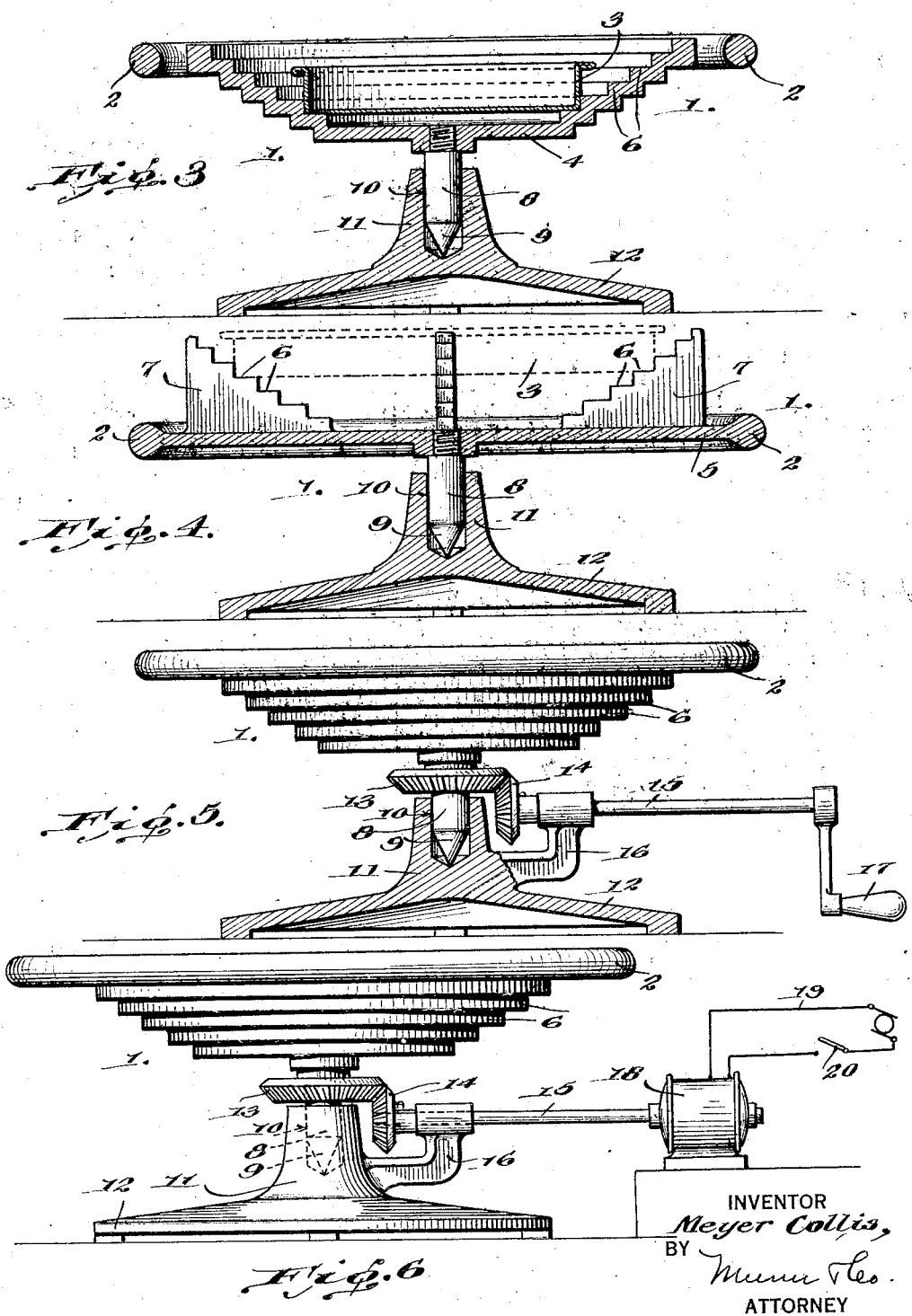

Patented Apr. 12, 1932

1,854,109

UNITED STATES PATENT OFFICE

MEYER COLLIS, OF CHARLESTON, SOUTH CAROLINA

DOUGH LEVELING MACHINE

Application filed April 8, 1931. Serial No. 528,693.

This invention relates to improvements in leveling apparatus and it consists of the constructions, combinations and arrangements herein described and claimed.

An object of the invention is to provide an apparatus for leveling the top surface of a plastic mass, the specific use of the machine intended herein being for bakers in leveling off the top surface of cake dough in round pans, an important attribute of the machine in any use being an expeditious completion of the leveling operation with but a few turns of the rotary carrier.

Another object of the invention resides in the novel method of leveling a lump of dough or other plastic mass, which method principally comprises the subjection of the mass to centrifugal force so that it will spread out toward the rim of its container and thus level off the top surface.

Other objects and advantages will appear in the following specification, reference being had to the accompanying drawings in which Figure 1 is a plan view of one form of the dough leveling machine.

Figure 3 is a cross section of the first form, taken on the line 3—3 of Figure 1, a circular pan being shown in position.

Figure 4 is a cross section of the second form taken on the line 4—4 of Figure 2.

Figure 5 is a partly elevational and sectional view of the dough leveling machine, illustrating the use of a hand crank and gearing for rotating the carrier.

Figure 6 is a side elevation of the dough leveling machine, illustrating the use of motor driven gearing for rotating the carrier.

This invention is an improvement on the cake dough level disclosed in an application filed by Meyer Collis March 26, 1931, Serial No. 525,537. The dough level in that application is intended for use in square or rectangular pans. The machine in the instant application is intended for leveling cake dough in circular pans.

The level of the first application is not capable of use in connection with circular pans because that level is designed to be guided along the edges of the pan so as to scrape off the high places and fill in the low places in the dough. It is because of the continuously changing direction of the rim of a circular pan that the level of the first application cannot be used as herein contemplated.

Centrifugal force is the principle of the present invention. Although the latter is described in connection with leveling cake dough, this is not to be regarded as any restriction on its use because the machine is applicable to leveling the top surface of any plastic mass which can be handled in a manner similar to a mass of dough.

There are two main forms of the invention. The operation of these is identical, there being but slight differences in construction. Each form comprises a rotary carrier 1 having a wheel 2 intended to be grasped by the hands for the purpose of giving the carrier a spin and thus setting it in rotation in order to cause the mass of dough in the inserted pan 3 (Fig. 3) to spread out by centrifugal force and thus level off the top surface.

Figure 1:
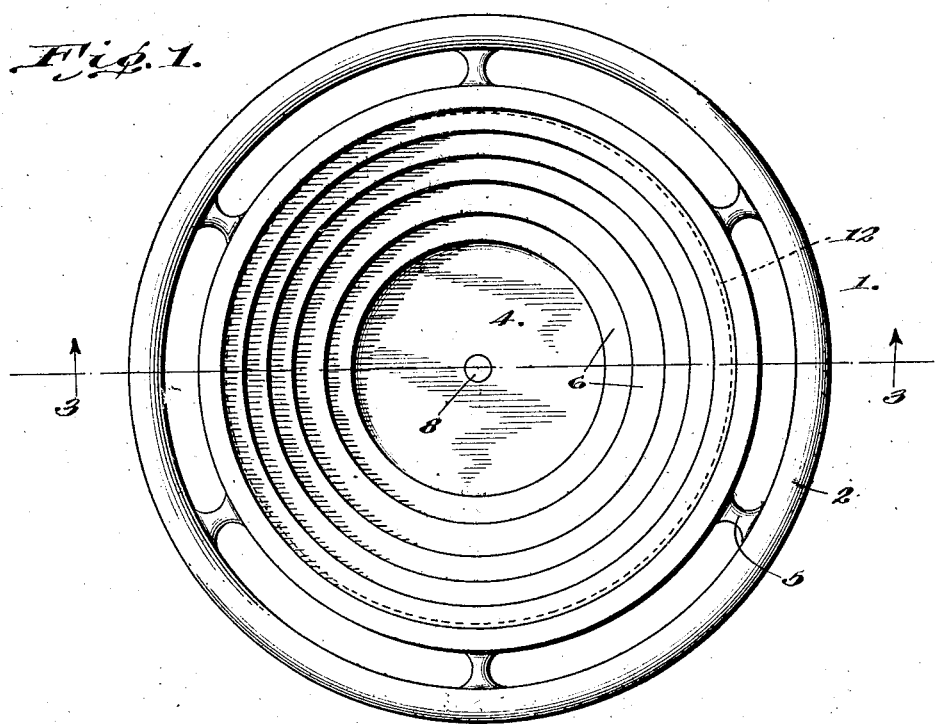

This wheel is connected with the body 4 of the carrier by a number of spokes 5. The body has a stepped arrangement for receiving any of the ordinary sizes of circular pans 3. In Figure 1 this arrangement comprises a plurality of concentric steps 6. These are progressively higher and larger (Fig. 3) so that the various sizes of pans can be set wherever they will fit.

Figure 2:
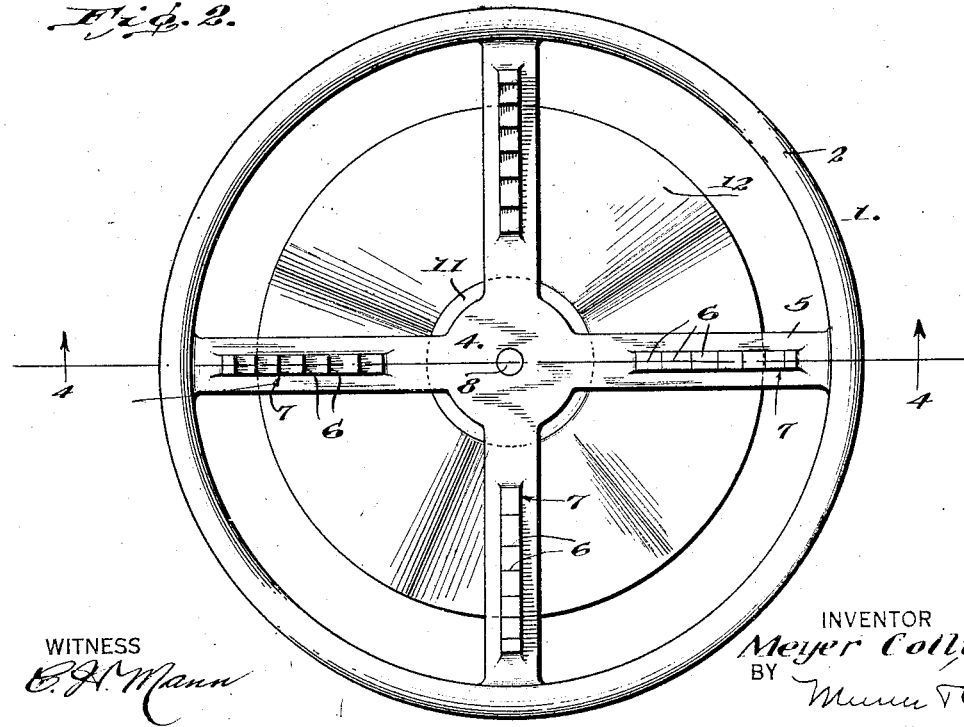
Figure 2 is a plan view of a second form of the dough leveling machine.

In the second form in Figure 2 the spokes 5 are fewer and larger, but they still carry a stepped supporting arrangement in the nature of narrow walls or blocks 9 (Fig. 4). These are stepped on the upper edges. They are so fixed upon the spokes 5 that the steps will be in circular alinement and thus comprise equivalents of the concentric steps 6 of Figures 1 and 3. A pan (dotted lines, Fig. 4) will be seated on these steps just as before (Fig. 3).

The second form has the advantage of cheaper construction over the first form. The first form has the advantage of weight, hence stability during rotation. But if the second form is in any way lacking in stability, the wheel 2 can be made sufficiently heavy to compensate for the reduction in material elsewhere. Thus it becomes a matter of preference in practice which of the two forms shall be used.

In order to provide a bearing for the rotating carrier 1 and at the same time diminish friction so that it will become negligible, the carrier is provided with a center pin 8 (Figs. 3 and 4), which is sharpened to a point 9.

This center pin occupies the bore 10 in the hub 11 of a base 12. The point 9 bears on the bottom of the bore, and the whole weight of the carrier with its applied load is concentrated at the point. It is thus evident that the carrier can be spun with a minimum effort, and when once set to rotating will spin freely.

In this connection it is not to be assumed that the carrier 1 must rotate for any great length of time. A few revolutions have been found sufficient to level off the top surface of a mass of dough placed in the pan 3 (Fig. 3). Although all of the weight is concentrated at the point 9, the side walls of the hub 11 are important in holding the center pin 8 erect.

In the first two forms of the invention the carrier 1 is intended to be rotated by taking hold of the wheel 2. Sometimes it may prove desirable to do the rotating by means of gearing. Figures 5 and 6 illustrate the use of a set of beveled gears 13, 14. The gear 13 is fixed on the center pin 8 in any appropriate manner. The gear 14 is secured to a shaft 15 which has bearing in a bracket 16 branching from the hub 11.

In Figure 5 the shaft 15 is equipped with a crank handle 17 for accomplishing the turning. In Figure 6 an electrical motor 18 is intended for the same purpose. This motor is connected in an electrical circuit 19 which includes a switch 20.

From the foregoing it will be understood that the invention also involves the novel method of leveling a plastic mass. The active principle of this method is the subjection of the mass to centrifugal force so that the mass is spread out in all directions to the rim of its container, and in being spread out automatically has its top surface leveled off smooth. This method is not all together the function of the instant machine because a mass of plastic material may be subjected to centrifugal force by an arrangement having different structural characteristics.

The operation is readily understood. A pan of any given size within range of the stepped arrangements of Figures 1 and 2 is put in place as in Figures 3 and 4, either with or without its mass of dough. A lump of dough is placed in the pan 3 whereupon the carrier 1 is set to rotating either by taking hold of the wheel 2 and giving it a spin, or by using either of the modes in Figures 5 and 6.

Centrifugal force will cause the lump of dough to spread out toward the rim of the circular pan. The leveling effect has been found to be perfectly uniform. The dough simply spreads out and it requires only a few revolutions of the carrier 1 to smooth out the top surface of the lump of dough to a perfectly level appearance.

The prevailing custom in leveling dough in a pan is to use a pallet knife, and it requires some time and patience to do the job satisfactorily. By using the principle of the instant leveling machine it becomes possible to level off the dough in many circular pans in the same time ordinarily required to level off the dough in a single pan by means of a pallet knife.

Usually the baker will be careful to place the lump of dough in the center of the pan because there will be no purpose in placing it off to one side. But it has been found that even if the lump of dough is placed to one side of the pan, the centrifugal force attendant upon rotating the carrier 1 will spread the dough out evenly in all directions to level off the top surface as though the mass had been placed in the center with the utmost accuracy.

Under a similar circumstance, namely a placing of the lump of dough to one side of the pan, the baker would have a great deal of difficulty in leveling out the mass with a pallet knife. The dough can be worked only so much and no more. The use of the pallet knife has a tendency to make voids or air pockets in the dough so that there will be more of the substance in one place than another. But by spinning the dough all voids will be eliminated throughout.

The wheel 2, in addition to providing a place to grasp the carrier 1 also acts in the capacity of a fly wheel. It has the tendency to stabilize the revolution of the carrier with the result that the dough is leveled off with a perfectly smooth top surface.

It is desired to say that both the carrier 1 and base 12 may be made of any desired material. It is contemplated to make the carrier of aluminum and the base 12 of iron. But it may be found the better practice to make both parts of iron.

While the construction and arrangement of the improved dough leveling machine is that of a generally preferred form, obviously modifications and changes may be made without departing from the spirit of the invention or the scope of the claims.

I claim:—

1. A leveling machine comprising a center pin, a body to which the pin is centrally connected, said body having a stepped pan-supporting arrangement disposed concentrically of the pin, means providing a bearing for the pin, and a concentric wheel connected with the body for rotating said body.

2. A leveling machine comprising a body formed into a plurality of successively smaller concentric steps, a hand wheel connected with the body for revolving it, a center pin connected with the body and having a point, and a base having a hub with a bore occupied by the pin, said point resting on the bottom of the bore.

3. A leveling machine comprising a body, a center pin connected with the body and having a point, a concentric hand wheel, a plurality of spokes connecting the hand wheel with the body, blocks carried by the spokes having setps on the top edge, said steps being in concentric alinement, and a base on which the body is revoluble, said base including a hub having a bore occupied by the center pin, the point of the pin resting on the bottom of the bore.

4. A leveling machine comprising a center pin having an axial point, a body to which the pin is centrally connected, said body having a stepped arrangement for receiving and holding level any one of a plurality of sizes of pans containing a plastic mass, and means to revolubly support the center pin comprising a hub having a bore centrally receiving the pin, the walls of the bore guiding the pin and tending to confine the superimposed weight at the point.

MEYER COLLIS.